United States Patent
Kim et al.

(10) Patent No.: US 9,076,200 B2
(45) Date of Patent: Jul. 7, 2015

(54) METHOD AND APPARATUS FOR REDUCING NOISE OF DIGITAL IMAGE

(75) Inventors: Gyu Won Kim, Gyunggi-do (KR); Kyoung Joong Min, Seoul (KR); Ho Seop Jeong, Gyunggi-do (KR); In Taek Song, Gyunggi-do (KR)

(73) Assignee: SAMSUNG ELECTRO-MECHANICS CO., LTD., Gyunggi-Do (KR)

( * ) Notice: Subject to any disclaimer, the term of this patent is extended or adjusted under 35 U.S.C. 154(b) by 665 days.

(21) Appl. No.: 13/298,444

(22) Filed: Nov. 17, 2011

(65) Prior Publication Data

US 2012/0170863 A1 Jul. 5, 2012

(30) Foreign Application Priority Data

Dec. 29, 2010 (KR) .................. 10-2010-0138334

(51) Int. Cl.
 G06K 9/40 (2006.01)
 G06T 5/00 (2006.01)
(52) U.S. Cl.
 CPC ....... *G06T 5/002* (2013.01); *G06T 2207/20192* (2013.01)
(58) Field of Classification Search
 None
 See application file for complete search history.

(56) References Cited

U.S. PATENT DOCUMENTS

| | | | |
|---|---|---|---|
| 5,134,667 A | 7/1992 | Suzuki | |
| 5,512,956 A | 4/1996 | Yan | |
| 5,883,983 A | 3/1999 | Lee et al. | |
| 2006/0245506 A1* | 11/2006 | Lin et al. | 375/240.29 |
| 2007/0211307 A1 | 9/2007 | Uvarov | |
| 2009/0257675 A1 | 10/2009 | Schweid | |
| 2012/0057796 A1* | 3/2012 | Kim et al. | 382/199 |

FOREIGN PATENT DOCUMENTS

| | | |
|---|---|---|
| KR | 19910005102 A | 3/1991 |
| KR | 20070089485 A | 8/2007 |

OTHER PUBLICATIONS

An Nieminen et al, "A New Class of Detail-Preserving Filters for Image Processing", IEEE 1987.*
Lee, Digital Image Smoothing and the Sigma Filter, CVGIP 1983.*
Cope et al, Have GPUs made FPGAs redundant in the field of Video Processing?, IEEE 2005.*
Office Action corresponding to KR 10-2010-0138334, dated May 25, 2012.
Gu, M.-R.; Kang, D-S.: Modified sigma filter using image decomposition. MUSP'10, Proceedings of the 10th WSEAS international conference on Multimedia systems & signal processing, Apr. 2010, pp. 193-198.
Office Action dated Aug. 25, 2014, issued in corresponding German Patent Application No. 102011119188.0.

* cited by examiner

*Primary Examiner* — Mark Roz
(74) *Attorney, Agent, or Firm* — Lowe Hauptman & Ham LLP (57) ABSTRACT

There are provided a method and an apparatus for reducing noise in a digital image capable of reducing noise while preventing damage to an edge of a digital image. The apparatus includes: a high pass filtering unit determining an edge region of an input image; a low pass filtering unit performing low pass filtering on a region of the input image determined not to be the edge region by the high pass filtering unit; and a sigma filtering unit performing sigma filtering on the region of the input image determined not to be the edge region by the high pass filtering unit.

15 Claims, 5 Drawing Sheets

METHOD AND APPARATUS FOR REDUCING NOISE OF DIGITAL IMAGE

CROSS-REFERENCE TO RELATED APPLICATIONS

This application claims the priority of Korean Patent Application No. 10-2010-0138334 filed on Dec. 29, 2010, in the Korean Intellectual Property Office, the disclosure of which is incorporated herein by reference.

BACKGROUND OF THE INVENTION

1. Field of the Invention

The present invention relates to a method and an apparatus for reducing noise in a digital image, and more particularly, to a method and an apparatus for reducing noise in a digital image capable of reducing noise while preventing damage to an edge of a digital image.

2. Description of the Related Art

An apparatus using a digital camera has been widely used in various fields. In particular, in accordance with the increase in the use of a camera in an electrical device used in a vehicle (for example, a camera used for a night vision system), the demand for technology for removing noise included in a digital image photographed during the night has been increased.

Noise in a digital image may be generated due to the physical characteristics and instability of an image sensor used for the camera, or may be generated during the processing of a digital image signal generated in the image sensor. In order to obtain improved image quality, an apparatus and a process for removing the noise should necessarily be used.

In a digital image processing field, various methods of reducing or removing noise have been suggested. However, in these methods, the brightness (luminance) or contour direction of an image and the patterns of the image and the noise have not been appropriately considered, such that an edge of the image is blurred and damaged, thereby having an negative effect on image quality.

SUMMARY OF THE INVENTION

An aspect of the present invention provides a method and an apparatus for reducing noise in a digital image capable of reducing noise, while preventing damage to an edge of a digital image.

According to an aspect of the present invention, there is provided an apparatus for reducing noise in a digital image, the apparatus including: a high pass filtering unit determining an edge region of an input image; a low pass filtering unit performing low pass filtering on a region of the input image determined not to be the edge region by the high pass filtering unit; and a sigma filtering unit performing sigma filtering on the region of the input image determined not to be the edge region by the high pass filtering unit.

The high pass filtering unit may include: a horizontal direction high pass filter detecting an edge existing in a horizontal direction in the input image; a vertical direction high pass filter detecting an edge existing in a vertical direction in the input image; and first and second diagonal direction high pass filters for respectively detecting edges existing in two diagonal directions in the input image.

The horizontal direction high pass filter, the vertical direction high pass filter, and the first and second diagonal direction high pass filters may determine that there is the edge when high pass filtering value calculated by each of the horizontal direction high pass filter, the vertical direction high pass filter, and the first and second diagonal direction high pass filters is larger than an average luminance value of pixels included in the input image.

The low pass filtering unit may compare an average luminance of pixels existing in a mask used for the low pass filtering with an average luminance of pixels in the input image, and calculate a low pass filtering value when the average luminance of the pixels existing in the mask is larger than the average luminance of the pixels in the input image.

The low pass filtering unit may include: a horizontal direction low pass filter performing low pass filtering on the input image in a horizontal direction; a vertical direction low pass filter performing low pass filtering on the input image in a vertical direction; and first and second diagonal direction low pass filters performing low pass filtering on the input image in two diagonal directions.

The sigma filtering unit may include: an applied mask determining unit determining a size of a mask to which the sigma filtering is to be applied for each pixel of the input image; an average luminance deviation calculating unit calculating luminance deviation between average luminance of pixels in the applied mask and luminance of each pixel in the applied mask, and calculating an average of the luminance deviations; and a sigma filtering processing unit performing the sigma filtering on the mask having pixels existing in a range determined by an average of the average luminance of the pixels in the applied mask and the luminance deviation calculated by the average luminance deviation calculating unit.

The applied mask determining unit may compare an average luminance value of pixels in a preset reference mask with an average luminance value of all pixels of the input image, and determine the size of the mask to be applied to the sigma filtering according to an interval to which a ratio of the average luminance value of the pixels in the reference mask and the average luminance value of all pixels of the input image belongs.

The average luminance deviation calculating unit may calculate the deviation between the average luminance value of the pixels included in the applied mask and the luminance value of the pixels included in the applied mask, calculate the average for the calculated deviation between the luminance values, and determine whether the luminance of each pixel of the applied mask is in the range of the upper/lower limit determined by the average luminance value of all pixels in the applied mask and the average value of the luminance deviation.

The average luminance deviation calculating unit may determine whether the luminance of each pixel of the applied mask is in the range of the upper/lower limit determined by the average luminance value of all pixels in the applied mask and the average value of the luminance deviations by using the following Equation 1, $$Y_{avg\_mask} - D_{avg} \leq Y_p \leq Y_{avg\_mask} + D_{avg} \quad \text{[Equation 1]}$$

where Yavg_mask indicates the average luminance value of all pixels in the applied mask, Davg indicates the deviation between the average luminance value of the pixels included in the applied mask and the luminance value of the pixels included in the applied mask, and Yp indicates the luminance value of any pixel in the applied mask.

According to another aspect of the present invention, there is provided a method of reducing noise in a digital image, the method including: performing high pass filtering on an input image in order to determine an edge region of the input image; perform low pass filtering on a region of the input image determined not to be the edge region thereof; and performing sigma filtering on the region of the input image determined not to be the edge region.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will be described with reference to the accompanying drawings. The exemplary embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. Therefore, it is to be noted that the shape and size of components shown in the drawings may be exaggerated in order to provide more clear description FIG. 1 is a block diagram of an apparatus for reducing noise in a digital image according to an exemplary embodiment of the present invention.

Figure 1:
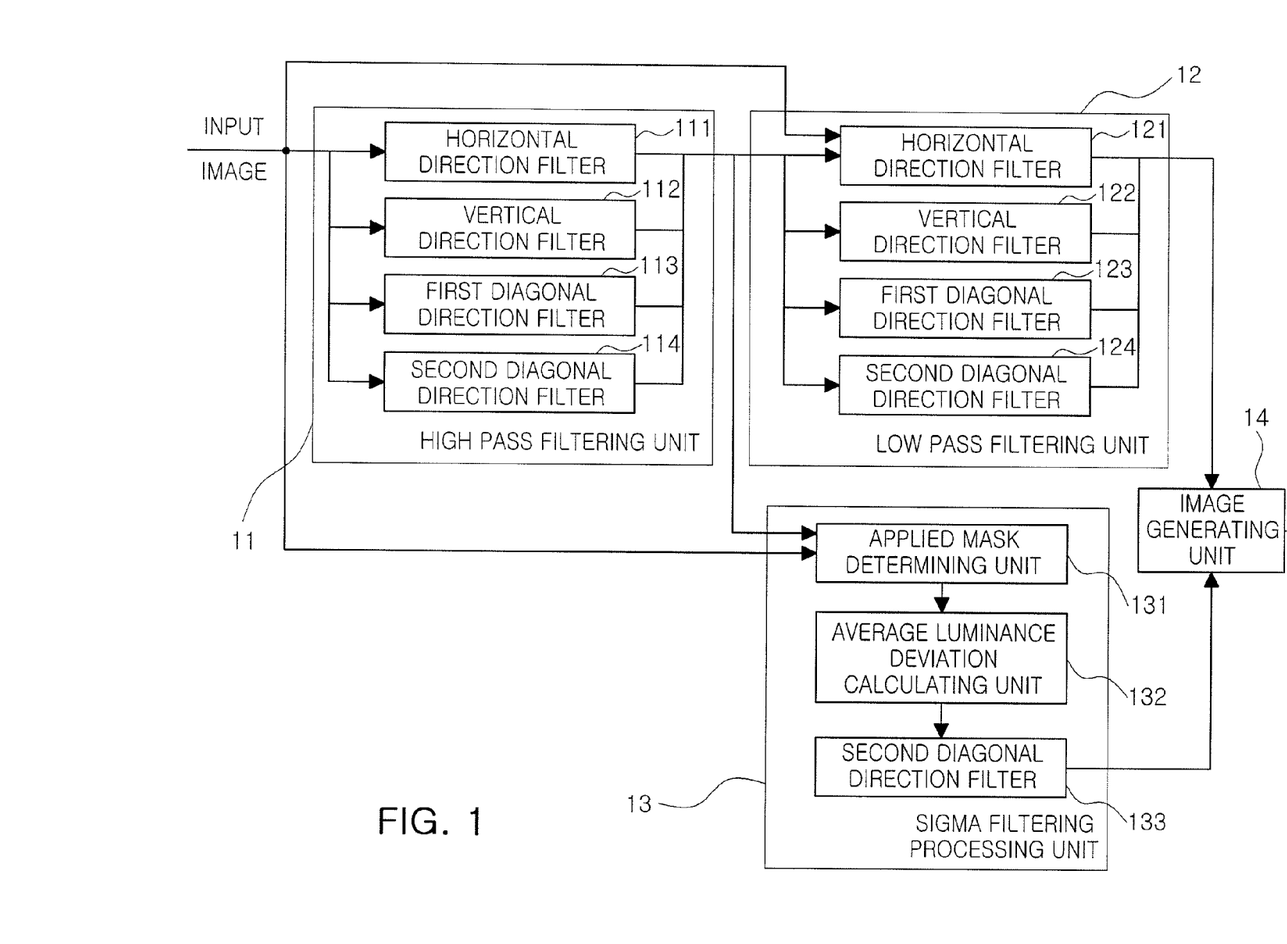
FIG. 1 is a block diagram of an apparatus for reducing noise in a digital image according to an exemplary embodiment of the present invention.

As shown in FIG. 1, an apparatus for reducing noise in a digital image according to an exemplary embodiment of the present invention may be configured to include a high pass filtering unit 11, a low pass filtering unit 12, and a sigma filtering unit 13.

The high pass filtering unit 11 may perform a high-pass filtering on an input image to extract high frequency components. The high frequency components in the digital image may appear on an edge region. Therefore, the high pass filtering unit 11 may determine the edge region in the inputted digital image.

The high pass filtering unit 11 may include a horizontal direction high pass filter 111 for detecting a horizontal direction edge in the input image, a vertical direction high pass filter 112 for detecting a vertical direction edge in the input image, and first and second diagonal direction high pass filters 113 and 114 for respectively detecting edges existing in two diagonal directions in the input image.

The plurality of high pass filters 111 to 114 may be implemented as a form of a mask for detecting an edge in a corresponding direction in the input image. The mask corresponding to the respective high pass filters 111 to 114 may calculate a filtering value by using relation between a center pixel and surrounding pixels of the mask, and may determine whether the center pixel of the mask is a pixel belonging to the edge region according to the filtering value.

The plurality of high pass filters 111 to 114 may compare outputted high pass filtering values with average luminance of the pixels included in the input image and may determine that there is the edge when the high pass filtering value is larger than the average luminance. In a case of a night vision image which is a very dark image, unnecessarily many edge components may be detected by a noise. Therefore, based on the average luminance of the input image, a pixel having a filtering value larger than the average luminance may be determined as the edge.

The high pass filtering unit 11 may output a determination result for regions having the edge existing in the input image and region not having the edge.

The low pass filter unit 12 may perform a low pass filtering operation on the input image to reduce noise components. That is, the low pass filtering unit 12 may apply a mask of a predetermined size having low pass characteristics to each pixel of the input image to reduce a luminance difference between a center pixel and surrounding pixels of the mask.

In a similar manner to the above-mentioned high pass filtering unit 11, the low pass filtering unit 12 may include a horizontal direction low pass filter 121, a vertical direction low pass filter 122, and first and second diagonal direction low pass filters 123 and 124 for performing the low pass filtering operation for the input image in a horizontal direction, a vertical direction, and two diagonal directions.

The horizontal direction low pass filter 121, the vertical direction low pass filter 122, and two diagonal direction low pass filters 123 and 124 may perform the low pass filtering on a region satisfied by two conditions. A first condition is that the region for which the low pass filtering is to be performed should be a region determined not to be the edge region by the high pass filtering unit 11, as described above. A second condition is that the average luminance of the pixels existing in the mask used for the low pass filtering is larger than the average luminance of all image pixels, as a result of comparison therebetween. The region satisfied by these two conditions may be determined as the noise region. The lower pass filtering unit 12 may perform the low pass filtering on the noise region to reduce noise.

An average of low pass filtering values in each direction may be calculated, and may be determined as a final filtering value of a corresponding pixel.

The sigma filtering unit 13 may perform sigma filtering for an input image.

The sigma filtering unit 13 according to an exemplary embodiment of the present invention may include an applied mask determining unit 131 determining the size of an applied mask for each pixel, an average luminance deviation calculating unit 132 calculating a luminance deviation between average luminance of pixels in the applied mask and luminance of each pixel, and averaging the luminance deviations, and a sigma filtering processing unit 133 performing sigma filtering on the mask having pixels existing in a range determined by the averaged luminance deviation and the average luminance of the pixels in the applied mask.

Figure 2:
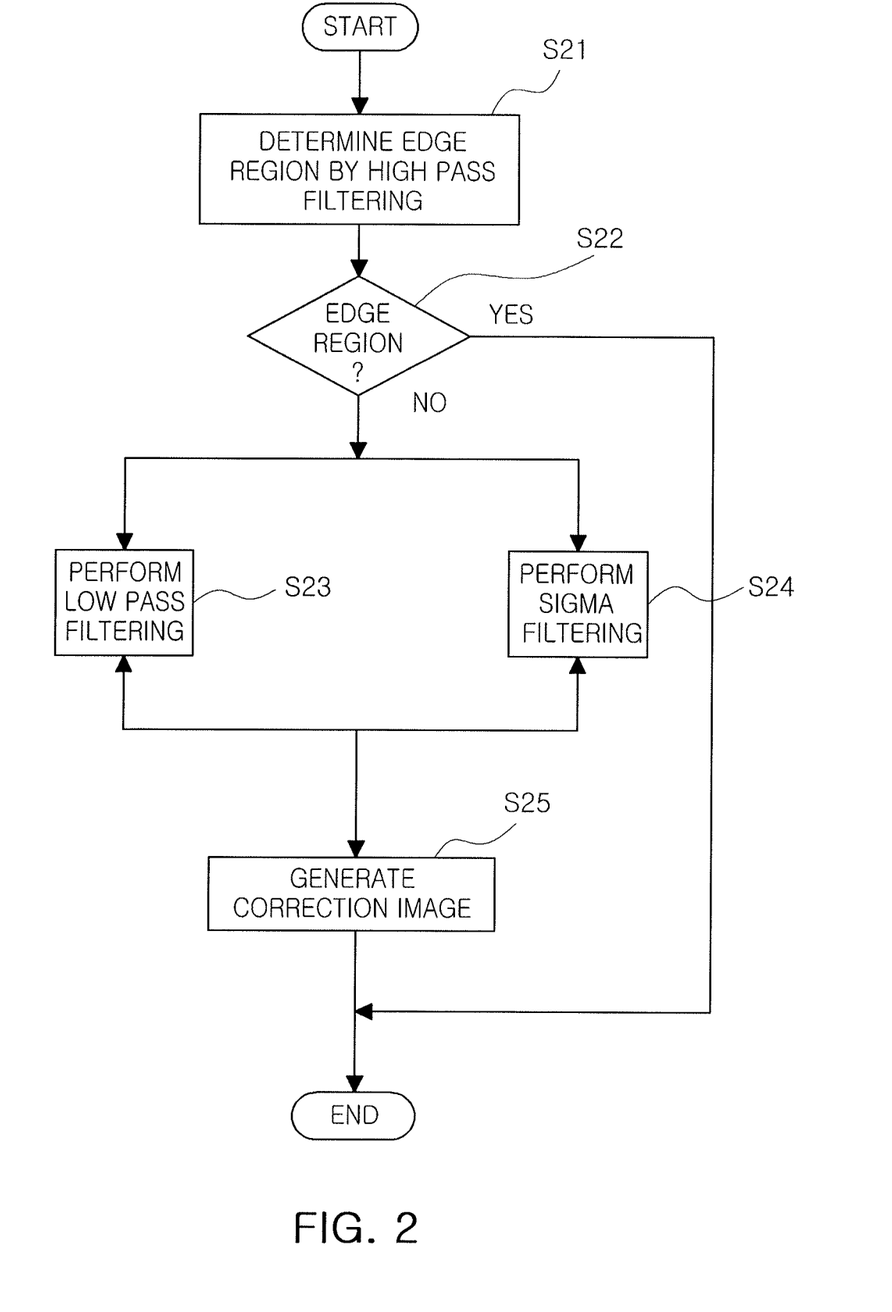
FIG. 2 is a flowchart showing a method of reducing noise in a digital image according to an exemplary embodiment of the present invention.

FIG. 2 is a flowchart showing a method of reducing noise in a digital image according to an exemplary embodiment of the present invention.

As shown in FIG. 2, a method of reducing noise in a digital image according to an exemplary embodiment of the present invention may include performing high pass filtering for an input image in order to determine an edge region of the input image (S21), performing low pass filtering on a region of the input image determined not to be the edge region (S23), and performing sigma filtering on the region of the input image determined not to be the edge region (S24).

Figure 3:
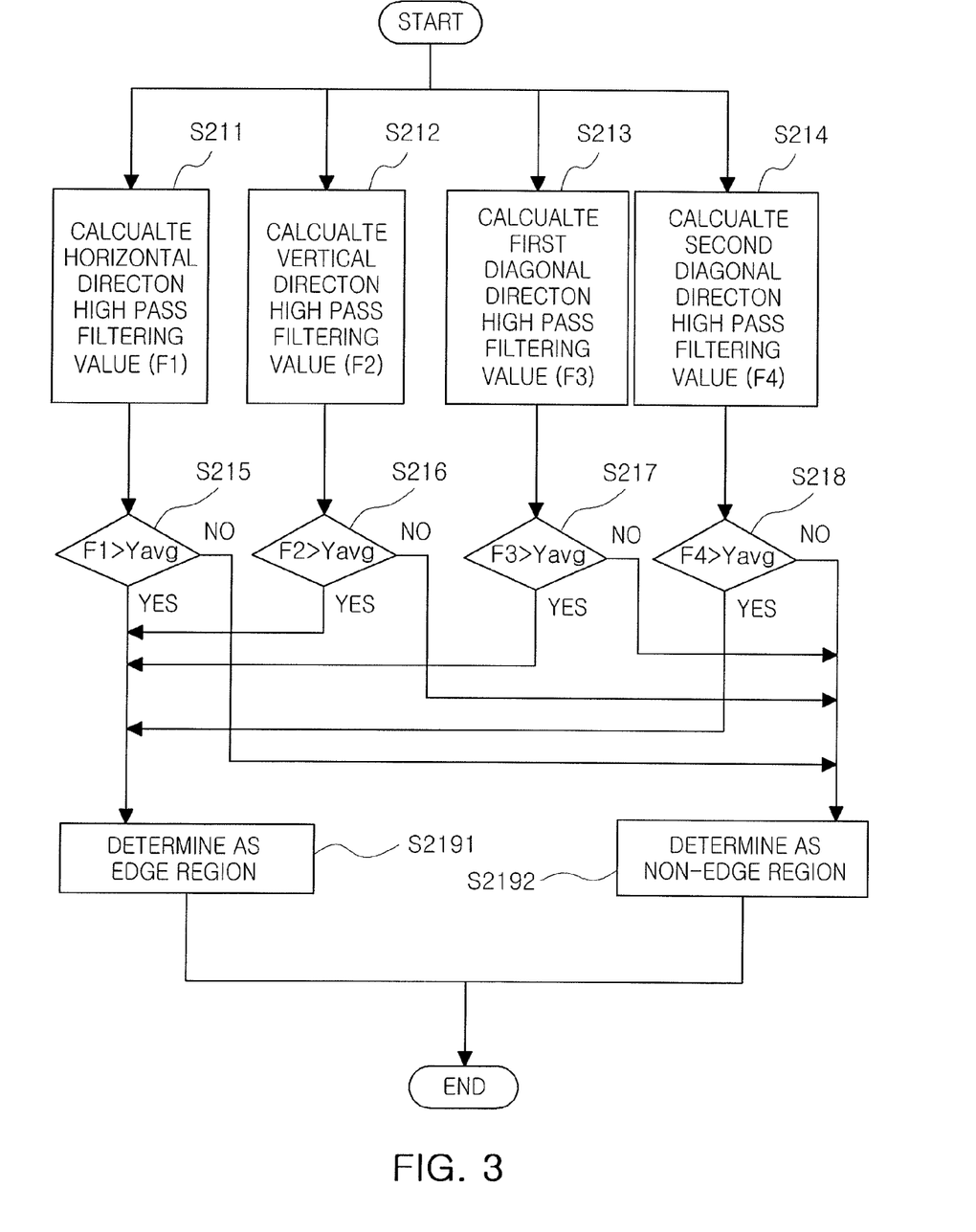
FIG. 3 is a flowchart specifically showing a high pass filtering operation included in a method of reducing noise in a digital image according to an exemplary embodiment of the present invention.
Figure 4:
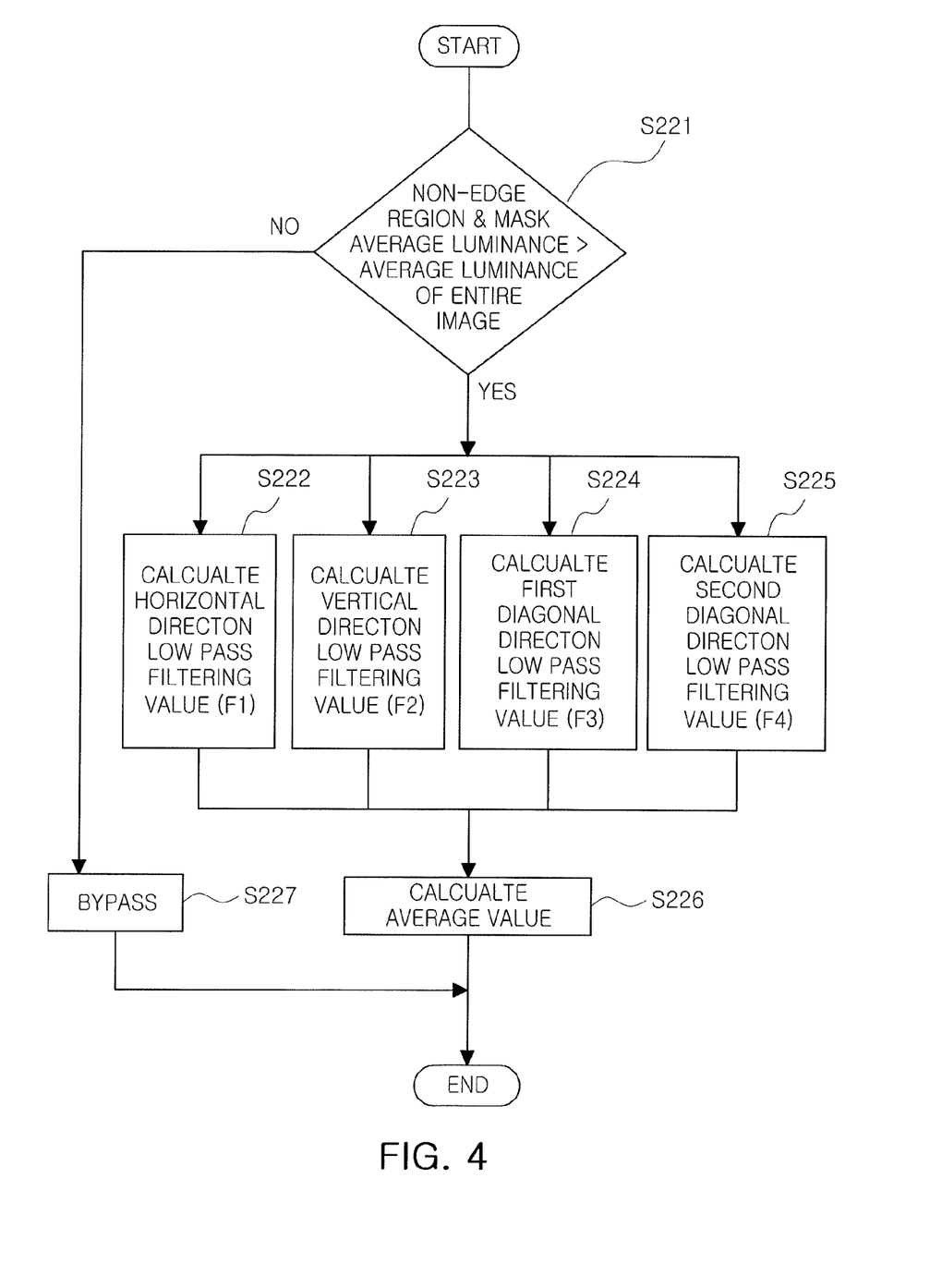
FIG. 4 is a flowchart specifically showing a low pass filtering operation included in a method of reducing noise in a digital image according to an exemplary embodiment of the present invention.
Figure 5:
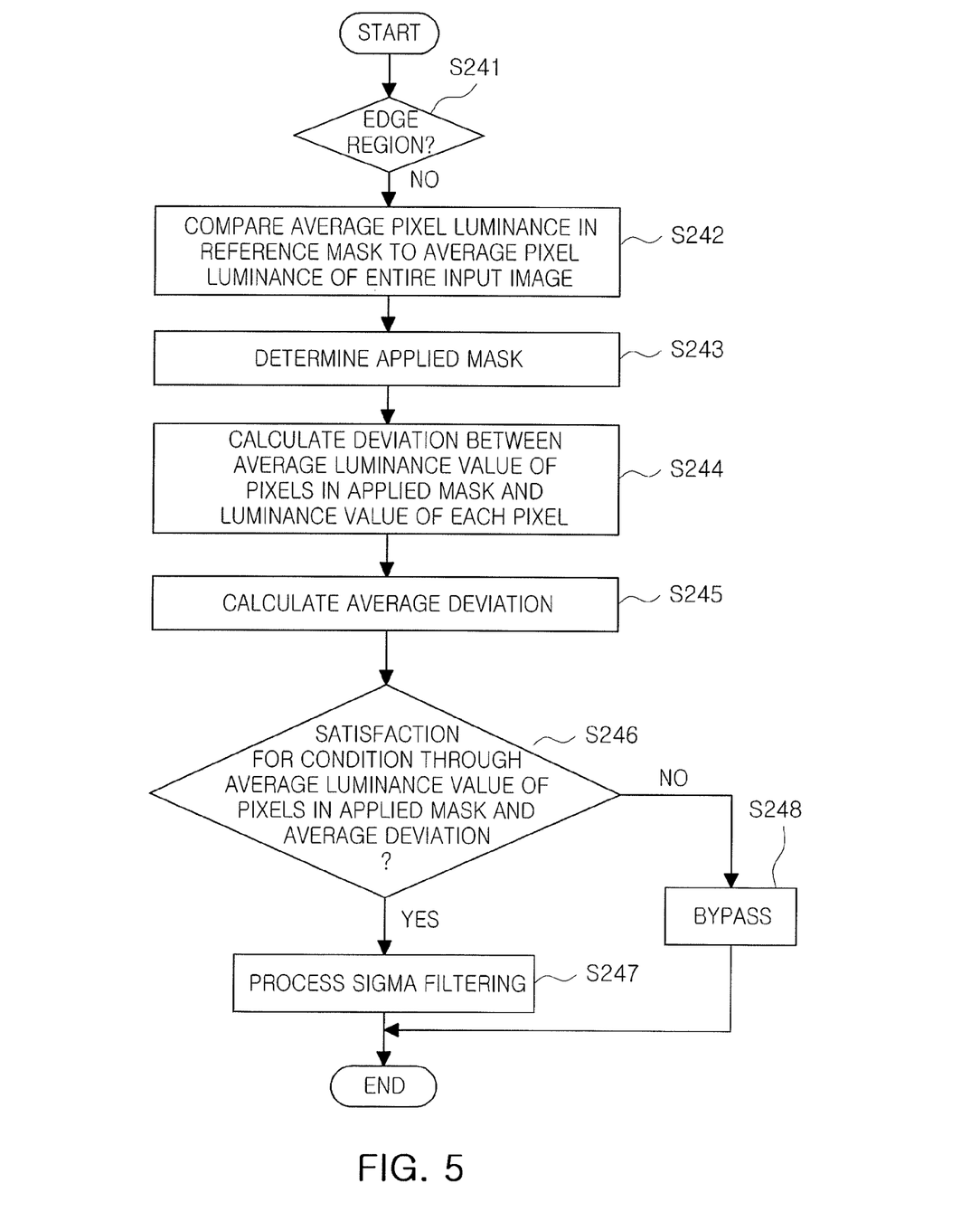
FIG. 5 is a flowchart specifically showing a sigma filtering operation included in a method of reducing noise in a digital image according to an exemplary embodiment of the present invention.

FIGS. 3 through 5 are flowcharts specifically showing operations S21, S23, and S24 of FIG. 2 included in a method of reducing noise in a digital image according to an exemplary embodiment of the present invention.

Hereinafter, operations and effects in a method and an apparatus for reducing noise in a digital image according to an exemplary embodiment of the present invention will be described in detail with reference to FIGS. 1 through 5.

According to an exemplary embodiment of the present invention, first, high pass filtering for an input image may be performed (S21). The high pass filtering may be performed by the high pass filtering unit 11.

The high pass filtering according to directionality of the input image may be performed by the horizontal direction high pass filter 111, the vertical direction high pass filter 112, and the first and second diagonal direction high pass filters 113 and 114 included in the high pass filtering unit 11 (S211-S214). The edge components existing in the input image may be extracted by the high pass filtering in consideration of the directionality.

Various methods of detecting edge components according to the directionality using the high pass filters 111 to 114 have been already known to those skilled in the art. Therefore, a detailed description therefor will be omitted in order to avoid obscuring the gist of the present invention.

Then, a plurality of high pass filters 111 to 114 in consideration of the directionality respectively compare the calculated filtering values with the average luminance value Yavg of all pixels included in the entire input image (S215-S218). The plurality of high pass filters 111 to 114 may compare the outputted high pass filtering values with the average luminance of the pixels included in the input image, and may determine that there is the edge when the high pass filtering value is larger than the average luminance (S2191). On the contrary, the plurality of high pass filters 111 to 114 may determine that there is no edge when the high pass filtering value is smaller than the average luminance (S2192).

In the case of a night vision image which is a very dark image, unnecessarily many edge components may be detected by a noise. Therefore, focused on the average luminance of the input image, a pixel having a filtering value larger than the average luminance may be determined as the edge.

The high pass filtering unit 11 may output an edge region determination result by the respective high pass filters 111 to 114. The edge region determination results outputted by the high pass filtering unit 11 are transferred to the low pass filtering unit 12 and the sigma filtering unit 13.

After the edge region determination is performed by the high pass filtering unit 11, the low passing filtering is performed by the low pass filtering unit 12 (S23), and the sigma filtering is performed by the sigma filtering unit 13 (S24).

The low pass filtering S23 and the sigma filtering S24 may be performed for regions of the input image determined not to be the edge regions by the high pass filtering (S21).

The low pass filtering S23 may be performed by the low pass filtering unit 12. After it is determined whether two conditions are satisfied (S221), actual processing for low pass filtering may be performed.

A first condition for performing the low pass filtering is that the region for which the low pass filtering is to be performed should be a region determined not to be the edge region by the high pass filtering unit 11, as described above.

A second condition for performing the low pass filtering is that an average luminance of pixels existing in a mask used for the low pass filtering is larger than the average luminance of the all image pixels, as a result of comparison therebetween.

The region satisfied by these two conditions may be determined as a noise region. The lower pass filtering unit 12 may perform the low pass filtering on the noise region to reduce the noise. When any one of these two conditions is not satisfied, the low pass filtering may not be performed (S227).

In a similar manner to the high pass filtering processing by the high pass filtering unit 11, the low pass filtering may also be performed in consideration of the directionality of the input image. That is, the low pass filtering according to each directionality of the image may be performed by the horizontal direction low pass filter 121, the vertical direction low pass filter 122, and the first and second diagonal direction low pass filters 123 and 124 included in the low pass filtering unit 12 (S222-S225).

Methods of performing the low pass filtering processing according to the directionality using the low pass filters 121 to 114 have been already known to those skilled in the art. Therefore, a detailed description therefor will be omitted in order to avoid obscuring the gist of the present invention.

An average of output values of the low pass filtering S222 to S225 according to each directionality may be calculated, and may be used as a low pass filtering value of a corresponding pixel (S226).

The sigma filtering S24 performed by the sigma filtering unit 13 may also be determined according to the edge region determination result by the high pass filtering unit 11 (S241). That is, the sigma filtering may be performed for the pixels in the region of the input image determined not to be the edge region.

The sigma filtering according to an exemplary embodiment of the present invention may start with an operation (S242) of comparing the average luminance value of pixels in a reference mask having a preset size with the average luminance value of all pixels of the input image and an operation (S243) of determining an applied mask to which the sigma filtering is to be applied.

That is, the applied mask determining unit 131 in the sigma filtering unit 13 may compare an average luminance value of pixels in the reference mask with the average luminance value of all pixels of the input image, and may determine the applied mask to which the sigma filtering is to be actually applied according to an interval to which a ratio of the average luminance value of the pixels in the reference mask and the average luminance value of all pixels of the input image belongs.

For example, a case in which the size of the reference mask is 5×5 and in which the interval for comparing the ratio of the average luminance value of the pixels in the reference mask to the average luminance value of all pixels of the input image is divided into a total of three reference intervals may be assumed. In this case, when the ratio of the average luminance value of the pixels in the reference mask and the average luminance value of all pixels of the input image belongs to a first interval, an applied mask of 1×1 may be determined. In addition, when the ratio of the average luminance value of the pixels in the reference mask and the average luminance value of all pixels of the input image belongs to a second interval, an applied mask of 3×3 may be determined. Further, when the ratio of the average luminance value of the pixels in the reference mask and the average luminance value of all pixels of the input image belongs to a third interval, an applied mask of 5×5 may be determined.

Then, the average luminance deviation calculating unit 132 in the sigma filtering unit 13 may calculate the deviation between the average luminance value of the pixels included in the applied mask and the luminance value of the pixels included in the applied mask (S244).

Then, the average luminance deviation calculating unit 132 may calculate an average for the deviations between the luminance values calculated in the operation S244, (S245).

Next, the average luminance deviation calculating unit 132 may determine whether the luminance of each pixel of the applied mask is within the range of the upper/lower limit determined by the average luminance value of all pixels in the applied mask and the average value of the luminance deviations (S246).

For example, a range for determination in the operation S246 may be set by the following Equation 1;

$$Y_{avg\_mask} - D_{avg} \leq Y_p \leq Y_{avg\_mask} + D_{avg} \quad \text{[Equation 1]}$$

where $Y_{avg\_mask}$ indicates an average luminance value of all pixels in the applied mask, $D_{avg}$ indicates a deviation between the average luminance value of the pixels included in the applied mask and the luminance value of the pixels included in the applied mask, and $Y_p$ indicates the luminance value of any pixel in the applied mask.

Then, the sigma filtering may be performed for the applied mask satisfied by Equation 1 (S247), and the sigma filtering may be omitted for the applied mask not satisfied by Equation 1 (S248).

Methods of configuring the sigma filtering unit 13 to apply the sigma filtering unit 13 to an image has been already known to those skilled in the art. Therefore, a detailed description therefor will be omitted in order to avoid obscuring the gist of the present invention.

As described above, the results of the low pass filtering and the sigma filtering may be applied to the input image by a correction image generating unit 14, whereby the image in which the noise is effectively removed in a state in which the edge region is not damaged may be obtained.

When the noise is removed according to the exemplary embodiments of the present invention, the quality of images that are dark and have much noise due to photographing using the camera for night vision, which is the camera for night electrical device, may be further improved.

As set forth above, according to the exemplary embodiments of the present invention, the noise may be accurately and effectively removed by separating a specific region and considering correlation between adjacent regions, together with correlation between pixels.

In addition, according to the exemplary embodiments of the present invention, the noise may be adaptively removed by considering the luminance of the pixels within the mask used for filtering and the luminance of the entire input image.

Further, according to the exemplary embodiments of the present invention, only the noise may be reduced without damaging the edge component.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for reducing noise in a digital image, the apparatus comprising:
   a high pass filtering unit determining an edge region of an input image;
   a low pass filtering unit performing low pass filtering on a region of the input image determined not to be the edge region thereof by the high pass filtering unit; and
   a sigma filtering unit performing sigma filtering on the region of the input image determined not to be the edge region by the high pass filtering unit,
   wherein the low pass filtering unit and the sigma filtering unit perform filtering in parallel,
   wherein the low pass filtering unit compares an average luminance of pixels existing in a mask used for the low pass filtering with an average luminance of pixels in the input image, and calculates a low pass filtering value when the average luminance of the pixels existing in the mask is larger than the average luminance of the pixels in the input image.

2. The apparatus of claim 1, wherein the high pass filtering unit includes:
   a horizontal direction high pass filter detecting an edge existing in a horizontal direction in the input image;
   a vertical direction high pass filter detecting an edge existing in a vertical direction in the input image; and
   first and second diagonal direction high pass filters for respectively detecting edges existing in two diagonal directions in the input image.

3. The apparatus of claim 2, wherein the horizontal direction high pass filter, the vertical direction high pass filter, and the first and second diagonal direction high pass filters determine that there is an edge when high pass filtering values calculated by each of the horizontal direction high pass filter, the vertical direction high pass filter, and the first and second diagonal direction high pass filters is larger than an average luminance value of pixels included in the input image.

4. The apparatus of claim 1, wherein the low pass filtering unit includes:
   a horizontal direction low pass filter performing low pass filtering on the input image in a horizontal direction;
   a vertical direction low pass filter performing low pass filtering on the input image in a vertical direction; and
   first and second diagonal direction low pass filters performing low pass filtering on the input image in two diagonal directions.

5. The apparatus of claim 1, wherein the sigma filtering unit includes:
   an applied mask determining unit determining a size of a mask to which the sigma filtering is to be applied for each pixel of the input image;
   an average luminance deviation calculating unit calculating luminance deviation between average luminance of pixels in the applied mask and luminance of each pixel in the applied mask, and calculating an average of the luminance deviations; and
   a sigma filtering processing unit performing sigma filtering on the mask having pixels existing in a range determined by an average between the average luminance of the pixels in the applied mask and the luminance deviation calculated by the average luminance deviation calculating unit.

6. An apparatus for reducing noise in a digital image, the apparatus comprising:
   a high pass filtering unit determining an edge region of an input image;
   a low pass filtering unit performing low pass filtering on a region of the input image determined not to be the edge region thereof by the high pass filtering unit; and
   a sigma filtering unit performing sigma filtering on the region of the input image determined not to be the edge region by the high pass filtering unit, wherein the low pass filtering unit and the sigma filtering unit performing filtering in parallel, wherein the sigma filtering unit includes:

an applied mask determining unit determining a size of a mask to which the sigma filtering is to be applied for each pixel of the input image;

an average luminance deviation calculating unit calculating luminance deviation between average luminance of pixels in the applied mask and luminance of each pixel in the applied mask, and calculating an average of the luminance deviations; and a sigma filtering processing unit performing sigma filtering on the mask having pixels existing in a range determined by an average between the average luminance of the pixels in the applied mask and the luminance deviation calculated by the average luminance deviation calculating unit, wherein the applied mask determining unit compares an average luminance value of pixels in a preset reference mask with an average luminance value of all pixels of the input image, and determines the mask to which the sigma filtering is to be applied according to an interval to which a ratio of the average luminance value of the pixels in the reference mask and the average luminance value of all pixels of the input image belongs.

7. The apparatus of claim 6, wherein the average luminance deviation calculating unit calculates the deviation between the average luminance value of the pixels included in the applied mask and the luminance value of the pixels included in the applied mask, calculates the average for the calculated deviations between the luminance values, and determines whether the luminance of each pixel of the applied mask is in the range of the upper/lower limit determined by the average luminance value of all pixels in the applied mask and the average value of the luminance deviations.

8. The apparatus of claim 7, wherein the average luminance deviation calculating unit determines whether the luminance of each pixel of the applied mask is in the range of the upper/lower limit determined by the average luminance value of all pixels in the applied mask and the average value of the luminance deviations by using the following Equation 1, $$Y_{avg\_mask} - D_{avg} \leq Y_p \leq Y_{avg\_mask} + D_{avg} \quad \text{[Equation 1]}$$

where Yavg_mask indicates the average luminance value of all pixels in the applied mask, Davg indicates the deviation between the average luminance value of the pixels included in the applied mask and the luminance value of the pixels included in the applied mask, and Yp indicates the luminance value of any pixel in the applied mask.

9. A method of reducing noise in a digital image, the method comprising:

performing high pass filtering on an input image in order to determine an edge region of the input image;

performing low pass filtering on a region of the input image determined not to be the edge region thereof; and performing sigma filtering on the region of the input image determined not to be the edge region, wherein the performing low pass filtering and performing sigma filtering are performed in parallel, wherein the performing of the low pass filtering includes: comparing an average luminance of pixels existing in a mask used for low pass filtering with an average luminance of pixels in the input image, and calculating a low pass filtering value when the average luminance of the pixels existing in the mask is larger than the average luminance of the pixels in the input image.

10. The method of claim 9, wherein the performing of the high pass filtering includes:

performing the high pass filtering on the input image in a horizontal direction;

performing the high pass filtering on the input image in a vertical direction; and performing the high pass filtering on the input image in first and second diagonal directions.

11. The method of claim 10, wherein the performing of the high pass filtering further includes:

comparing high pass filtering values calculated in the performing of the high pass filtering on the input image in the horizontal direction, and the performing of the high pass filtering on the input image in the vertical direction, and the performing of the high pass filtering on the input image in the first and second diagonal directions with an average luminance value of pixels included in the input image;

determining that there is an edge when the calculated high pass filtering values are larger than the average luminance value of the pixels included in the input image; and determining that there is no edge when the calculated high pass filtering values are smaller than the average luminance value of the pixels included in the input image.

12. The method of claim 9, wherein the performing of the low pass filtering includes:

performing the low pass filtering on the input image in a horizontal direction;

performing the low pass filtering on the input image in a vertical direction; and performing the low pass filtering on the input image in two diagonal directions.

13. The method of claim 9, wherein the performing of the sigma filtering includes:

determining a size of a mask to which the sigma filtering is to be applied for each pixel of the input image;

calculating luminance deviation between an average luminance of pixels in the applied mask and luminance of each pixel in the applied mask, and calculating an average of the luminance deviations;

determining a reference range of sigma filtering calculation using an average between the average luminance of the pixels in the applied mask and the luminance deviation; and performing the sigma filtering calculation on the mask having pixels existing within the reference range.

14. A method of reducing noise in a digital image, the method comprising:

performing high pass filtering on an input image in order to determine an edge region of the input image;

performing low pass filtering on a region of the input image determined not to be the edge region thereof; and performing sigma filtering on the region of the input image determined not to be the edge region, wherein the performing of low pass filtering and the performing of sigma filtering are performing in parallel, wherein the performing of the sigma filtering includes:

determining a size of a mask to which the sigma filtering is to be applied for each pixel of the input image;

calculating luminance deviation between an average luminance of pixels in the applied mask and luminance of each pixel in the applied mask, and calculating an average of the luminance deviations;

determining a reference range of sigma filtering calculation using an average between the average luminance of the pixels in the applied mask and the luminance deviation; and performing the sigma filtering calculation on the mask having pixels existing within the reference range, wherein the determining of the size of the mask includes comparing an average luminance value of pixels in a preset reference mask with an average luminance value of all pixels of the input image, and determining the size of the mask to be applied to the sigma filtering according to an interval to which a ratio of the average luminance value of the pixels in the reference mask and the average luminance value of all pixels of the input image belongs.

15. A method of reducing noise in a digital image, the method comprising:

performing high pass filtering on an input image in order to determine an edge region of the input image;

performing low pass filtering on a region of the input image determined not to be the edge region thereof; and performing sigma filtering on the region of the input image determined not to be the edge region, wherein the performing of low pass filtering and the performing of sigma filtering are performing in parallel, wherein the performing of the sigma filtering includes:

determining a size of a mask to which the sigma filtering is to be applied for each pixel of the input image;

calculating luminance deviation between an average luminance of pixels in the applied mask and luminance of each pixel in the applied mask, and calculating an average of the luminance deviations;

determining a reference range of sigma filtering calculation using an average between the average luminance of the pixels in the applied mask and the luminance deviation; and performing the sigma filtering calculation on the mask having pixels existing within the reference range, wherein the determining of the reference range includes determining whether the luminance of each pixel of the applied mask is in the range of the upper/lower limit determined by the average luminance value of all pixels in the applied mask and the average value of the luminance deviations by using the following equation $$Y_{avg\_mask} - D_{avg} \leq Y_p \leq Y_{avg\_mask} + D_{avg}$$

where $Y_{avg\_mask}$ indicates the average luminance value of all pixels in the applied mask, $D_{avg}$ indicates the deviation between the average luminance value of the pixels included in the applied mask and the luminance value of the pixels included in the applied mask, and $Y_p$ indicates the luminance value of any pixel in the applied mask.

* * * * *